United States Patent [19]

Kawabata et al.

[11] 3,900,716

[45] Aug. 19, 1975

[54] OPTICAL STATIC CARD READER

[75] Inventors: Hidetsugu Kawabata, Hirakata; Toshio Yamashita, Katano; Hiroshi Uda, Kashiwara; Manabu Yoshida; Saburo Kitamura, both of Kyoto, all of Japan

[73] Assignee: Matsushita Electric Industrial Co., Ltd., Kadoma, Japan

[22] Filed: Oct. 12, 1973

[21] Appl. No.: 406,038

[30] Foreign Application Priority Data

| | | |
|---|---|---|
| Oct. 17, 1972 | Japan | 47-104270 |
| Oct. 17, 1972 | Japan | 47-104271 |
| July 23, 1973 | Japan | 48-82952 |

[52] U.S. Cl.....235/61.11 E; 250/211 J; 340/146.3 Z

[51] Int. Cl. .......... G06k 7/14; H01j 39/12

[58] Field of Search ......... 250/211 J, 566, 567, 568, 250/569, 570; 235/61.12 N, 61.12 R, 61.11 E, 61.6 E; 340/146.3 Z

[56] References Cited

UNITED STATES PATENTS

| | | | |
|---|---|---|---|
| 3,596,063 | 7/1971 | Curtis | 235/61.11 F |
| 3,628,031 | 12/1971 | Azure | 250/569 |
| 3,680,080 | 7/1972 | Maure | 235/61.11 E |
| 3,781,553 | 12/1973 | Berkovskaya | 250/211 J |

*Primary Examiner*—Daryl W. Cook
*Assistant Examiner*—Robert M. Kilgore
*Attorney, Agent, or Firm*—Stevens, Davis, Miller & Mosher

[57] ABSTRACT

An optical static card reader comprises a light sensor matrix device including in combination a reference type light sensor matrix for reading the card and compensating light sensors for compensating for fluctuations and secular variation in individual sensors. A sensor for static reading of punched cards and a compensating sensor may constitute a voltage divider circuit. Reading of the punched cards is performed in the form of a voltage at the voltage dividing point which varies with the ratio of sensor resistance responsive to bright states to that responsive to dark states. This ensures a highly reliable card reader insensitive to deterioration of sensor ability and fluctuations or variations in illumination and power source voltage.

10 Claims, 12 Drawing Figures

OPTICAL STATIC CARD READER

This invention relates to optical card readers, and more particularly to a light sensor matrix device suitable for optical static card readers which provides improved stable and reliable opration.

As compared to a card reader of the type wherein light sensors are arranged one-dimensionally and a punched card is read out during its transportation above the arrangement of light sensors, a static card reader which comprises a two-dimensional sensor arrangement corresponding to punched holes in a card has an extremely simple mechanical structure. However, in order to discriminate the holed-state of the card from the no holed-state of the card (hereinafter referred to as the bright state and dark state, respectively) without erroneous operation, resistance values of the sensors are required to be determined so as to comply with the most unfavorable resistance value of some sensors among a large number of two-dimensionally arranged sensors (in the case of a matrix of 10 columns and 10 rows, the number of sensors is 10 × 10 = 100). Under a number of fluctuating environmental conditions, it was difficult to maintain the resistance value within a predetermined and relatively small range suitable for various working conditions, giving rise to many difficulties in manufacture of the sensors. Accordingly, it was a general tendency to use sensors whose resistance distribution reached the limit of the allowable working range, and the card reader tended to be sensitive to deterioration of the light source, fluctuations in light intensity and deterioration in performance of the sensor, resulting in unreliable and unstable operation.

On the other hand, to completely protect the circuits of a card reader from the influence of various fluctuating conditions, it was necessary to incorporate into the card reader a high-quality and complicated auxiliary circuit which was capable of compensating for undesirable sophisticated variations in the operation and performance of the sensors.

Accordingly, a principal object of this invention is to provide a novel light sensor matrix device suitable for optical static card readers which permits reading the cards under compensation achieved without using a complicated auxiliary circuit to influence various fluctuating conditions such as fluctuations in the voltage of the light source for illuminating the punched holes of the card, fluctuations and attenuation in illumination intensity due to deterioration of the light source lamp, and fluctuations of light sensors due to aging and temperature therein.

Another object of this invention is to provide an optical card reader which is simple in structure, easy to fabricate, inexpensive, and reliable in operation.

Another object of this invention is to provide an optical sensor matrix device which comprises a card reader light sensor arranged in the form of a matrix and compensator means compensating for the operation of this card reader light sensor and card position.

Another object of this invention is to provide a reference type optical card reader which includes a light sensor matrix device provided with means for preventing interactions between column or row phases of the matrix.

Still another object of this invention is to provide a reference type optical card reader in which a card reader light sensor matrix device and a plurality of compensating light sensors are uniformly illuminated by light.

Another object of this invention is to provide a reference type optical card reader capable of readily matching an output circuit.

According to this invention, there is provided an optical sensor matrix device comprising light sensors for reading a holed card which are arranged two-dimensionally corresponding to the position of holes of the card and connected in the form of a matrix, and a compensating light sensor provided for each column or each row of the reading light sensor matrix, wherein the compensating light sensors have characteristics substantially similar to those of the reading light sensors and all of the sensors including reading sensors and compensating sensors are connected in matrix form.

Other object, features and advantages of the invention will become apparent from the following detailed description of some preferred embodiments of the invention when taken in conjunction with the accompanying drawings in which, FIGS. 1*a* and 1*b* are wiring diagrams of sensor matrices of the invention illustrating the application thereof, FIG. 1*a* being illustrated as a column positive matrix and FIG. 1*b* a row positive matrix;

Figure 5:
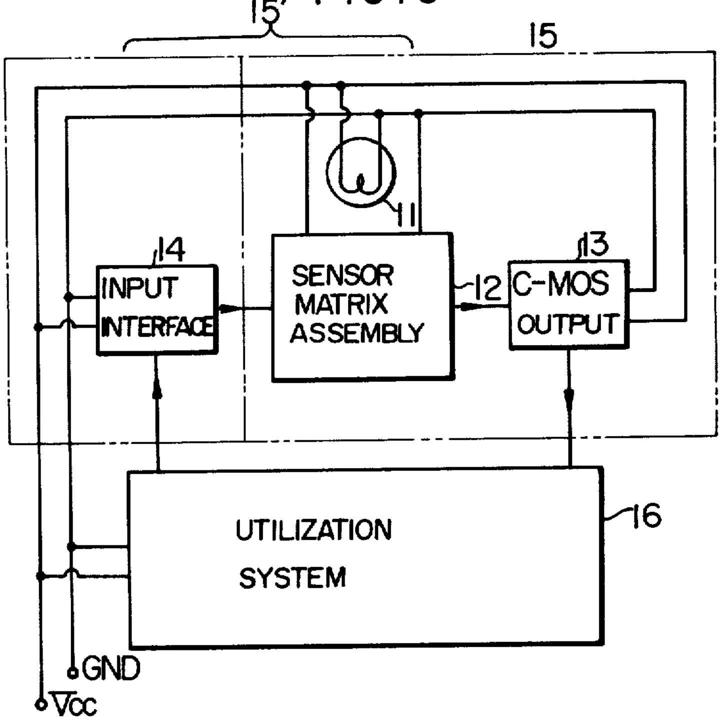
FIG. 5 is a constructional block diagram of the card reader which employs an output interface circuit constituted by complimentary-MOS integrated circuits.
Figure 6:
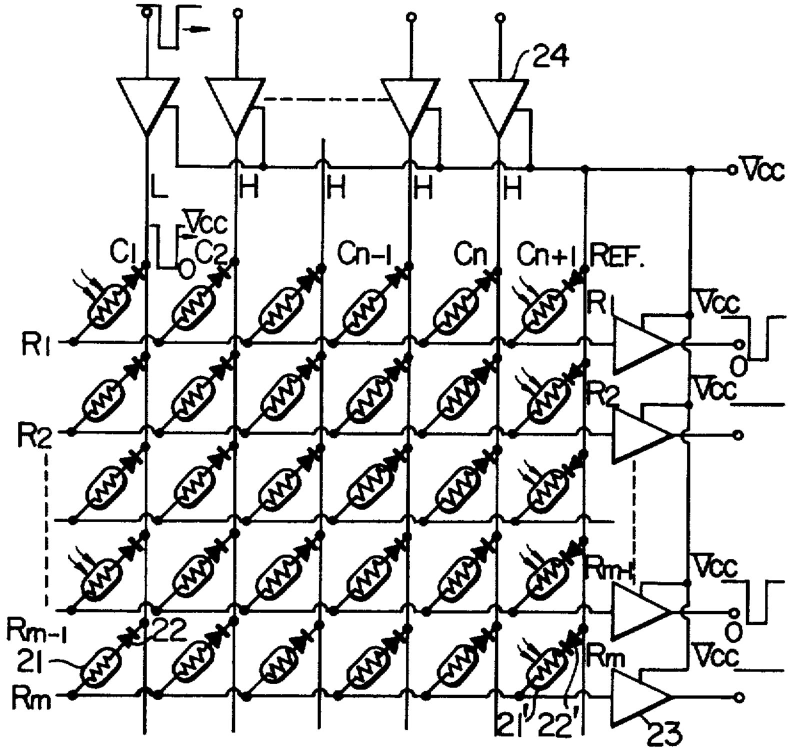
Figure 7A:
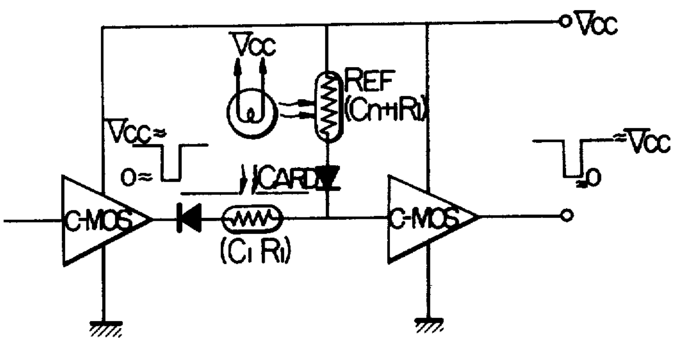
Figure 7B:
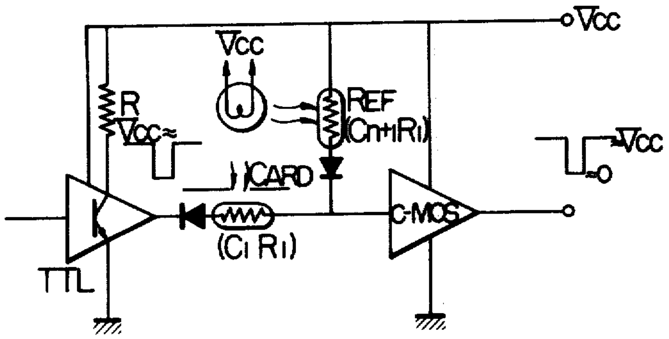
Figure 8:
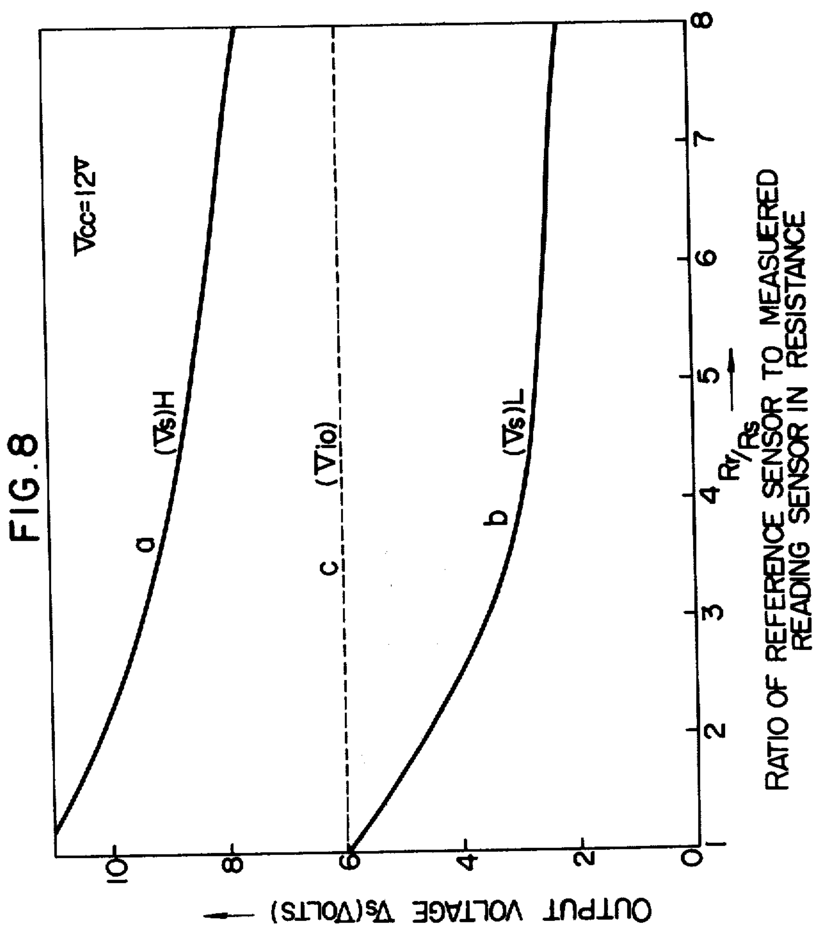

FIGS. 6, 7*a* and 7*b* are wiring diagrams illustrating interconnections between the reference type sensor matrix, input interface circuit, output interface circuit and power source of the card reader shown in FIG. 5; and FIG. 8 is a graph showing conditions for manufacturing the sensor matrix.

Figure 1A:
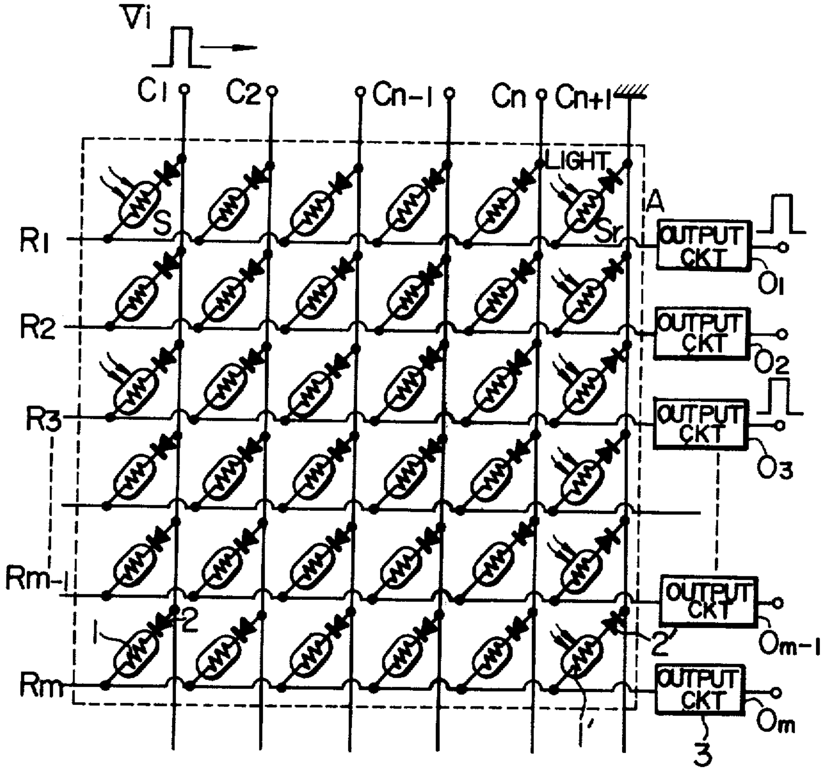
Figure 1B:
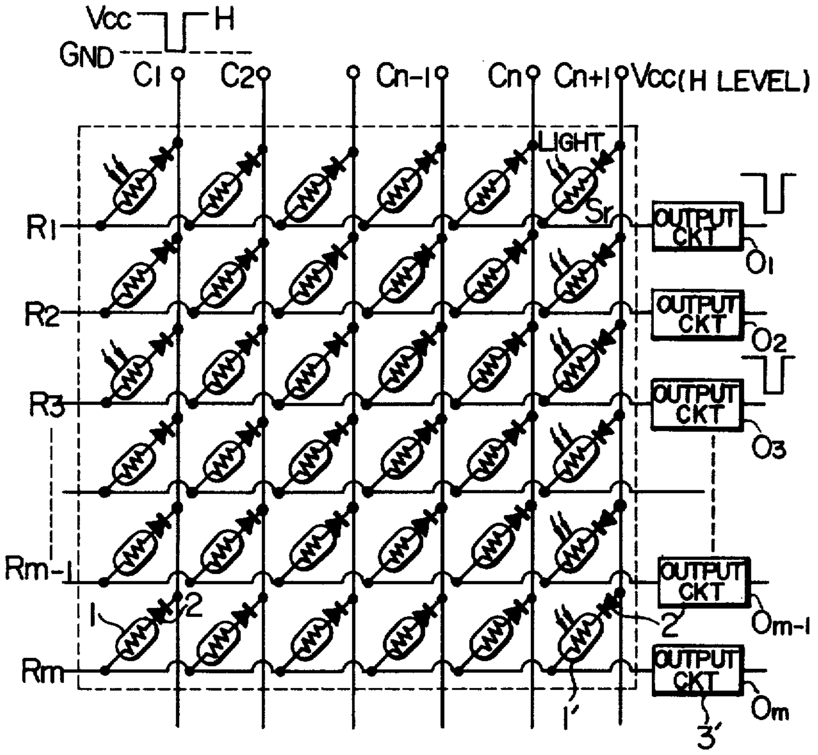

Reference is now made to FIGS. 1*a* and 1*b* illustrating embodiments of sensor matrices according to the invention. In these embodiments, reading of a card may be effected by applying a reading signal to respective columns and deriving a sensor signal from respective rows in parallel relation; conversely, a reading signal may be applied to respective rows and a sensor signal may be derived from respective columns in parallel. The sensor matrix shown in FIG. 1 comprises light sensors 1 for reading punched holes of a card, the light sensors being formed of photoconductive material such as CdS and CdSe, or phototransitors, and blocking diodes 2 for preventing interactions between light sensors. Reference numeral 3 designates output circuits for deriving a sensor signal. In addition to the above constituents, according to the invention, there are provided an additional column or row for compensation including diodes 2′ connected in opposite sense to the blocking diodes 2 and a group of reference sensors 1′.

A discrete diode or a junction of photoconductive material directly contacted with a rectifying contact may be used as the diode 2.

Where a positive-going signal is applied to respective columns for reading the card, usually a $C_{n+1}$ column, that is a column for compensation, is grounded as shown in FIG. 1*a*. (Thus, a low level is set.)

In the case where a negative-going reading signal is applied to respective columns for reading the card, the $C_{n+1}$ column is biased with a D.C. voltage to maintain a high logic level. The column for compensation is one of the matrix wirings and in operation, a single common line need only be grounded or predeterminedly biased. This, in view of the simplification of wiring, is a great advantage of this invention.

Figures 2A, 2B, 2C:
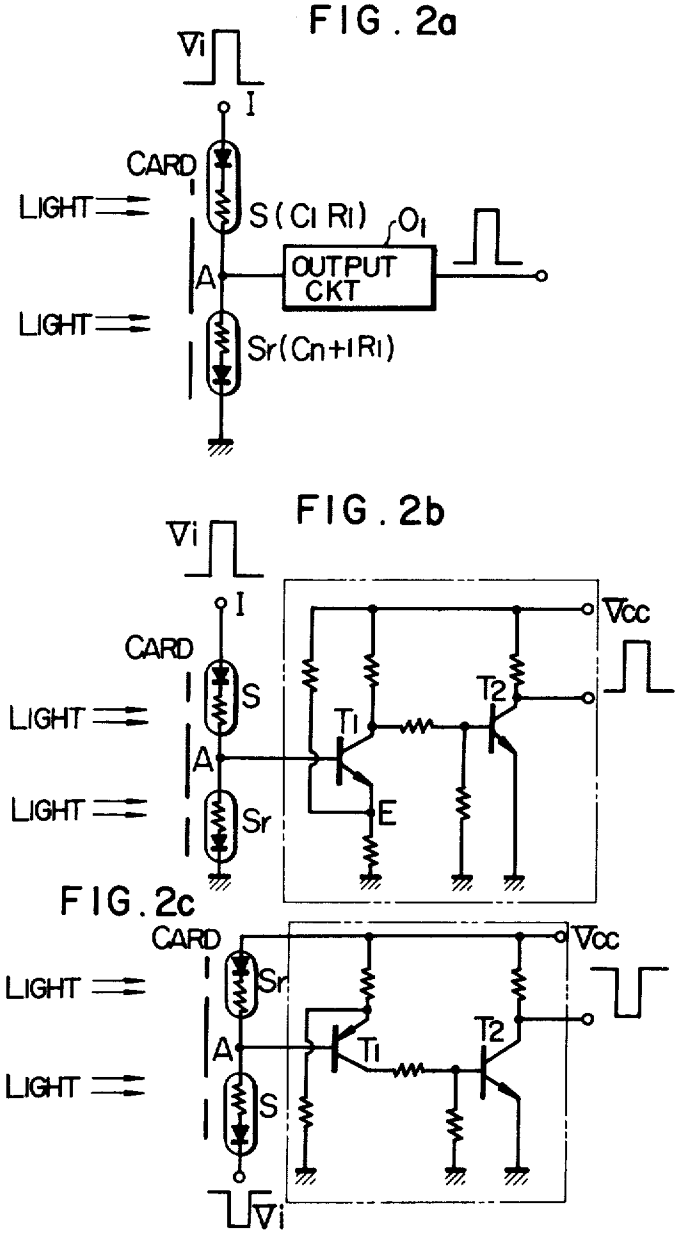
FIG. 2 is a diagram showing the connection between the reference type sensor matrix and an output circuit shown in FIG. 1, especially FIG. 2*a* being a block circuit diagram, and FIGS. 2*b* and 2*c* being transitorized output circuits for the column positive matrix and for the row positive matrix, respectively.

With reference to FIG. 1*a*, where a pulse is applied to the first column $C_1$ and a hole of a card associated with a sensor corresponding to column $C_1$ and row $R_1$ is read, a simplified connection as shown in FIG. 2*a* is available. In such case, the card is read under the condition that a hole is associated with a reading sensor S corresponding to column $C_1$ and row $R_1$ and a reference sensor $S_r$ is illuminated at the same intensity as the reading sensor S. Assuming that the input impedance of an output circuit $O_1$ is neglected, the voltage at point A is determined by the reading pulse voltage $V_i$ divided the resistance $R_s$ of the reading sensor and the resistance $R_r$ of the reference sensor. When the reading sensor S corresponding to column $C_1$ and row $R_1$ is not associated with a hole, the resistance $R_s$ increases and a voltage $V_s$ at point A becomes $(V_s)_L$ which is lower than $(V_s)_H$, where $(V_s)_L$ represents a low level value of the voltage $V_s$ and $(V_s)_H$ a high level value of the voltage $V_s$.

Therefore, a transition (boundary) region of the transfer characteristic of the output circuit $O_1$ is required to be set between $(V_s)_H$ and $(V_s)_L$. In cooperation with the application of a reading signal to any of the columns on the same row, a common reference for compensation can be used. Namely, a connection as shown in FIG. 2*a* is established. Where both the reading sensor S and reference sensor $S_r$ are brought into the bright state, since there sensors undergo a similar change in accordance with various changes in the environmental conditions, the voltage $(V_s)_H$ at point A remains almost unchanged. When the reading sensor S is brought into the dark state, the voltage $(V_s)_L$ at point A is immune to such a change as is caused when the resistance of the reading sensor and that of the reference sensor for compensation in the bright state vary proportionally. In other words, stability of the reading of the card can be ensured against unwanted changes or fluctuations in the environmental conditions.

The changes in the environmental conditions may be listed as follows:

a. Variation in intensity of illumination due to change in lighting voltage of a lamp, b. Attenuation in intensity of illumination due to degradation of luminous flux of lighting the lamp, c. Aging deterioration of the light sensor, d. Factor of temperature variation of the light sensor (by which the resistance of the sensor in the bright state and that in the dark state vary proportionally), e. Hysteresis phenomenon of the sensor responsive to intensity of illumination and temperature, f. Contamination between light sensor and light source which influences all of the light sensors uniformiy.

Especially, light sensors made of photoconductive elements such as CdS, CdSe encounter the problem of hysteresis. The resistance of the photoconductive element varies depending on the status of the photoconductive element prior to reading of the card. A photoconductor which has been placed in the dark at a high temperature will have a small resistance in the bright state. However, the reference element varies in the same manner so that the voltage dividing ratio is maintained substantially constant and a variation in the voltage at point A can be prevented.

Figure 3:
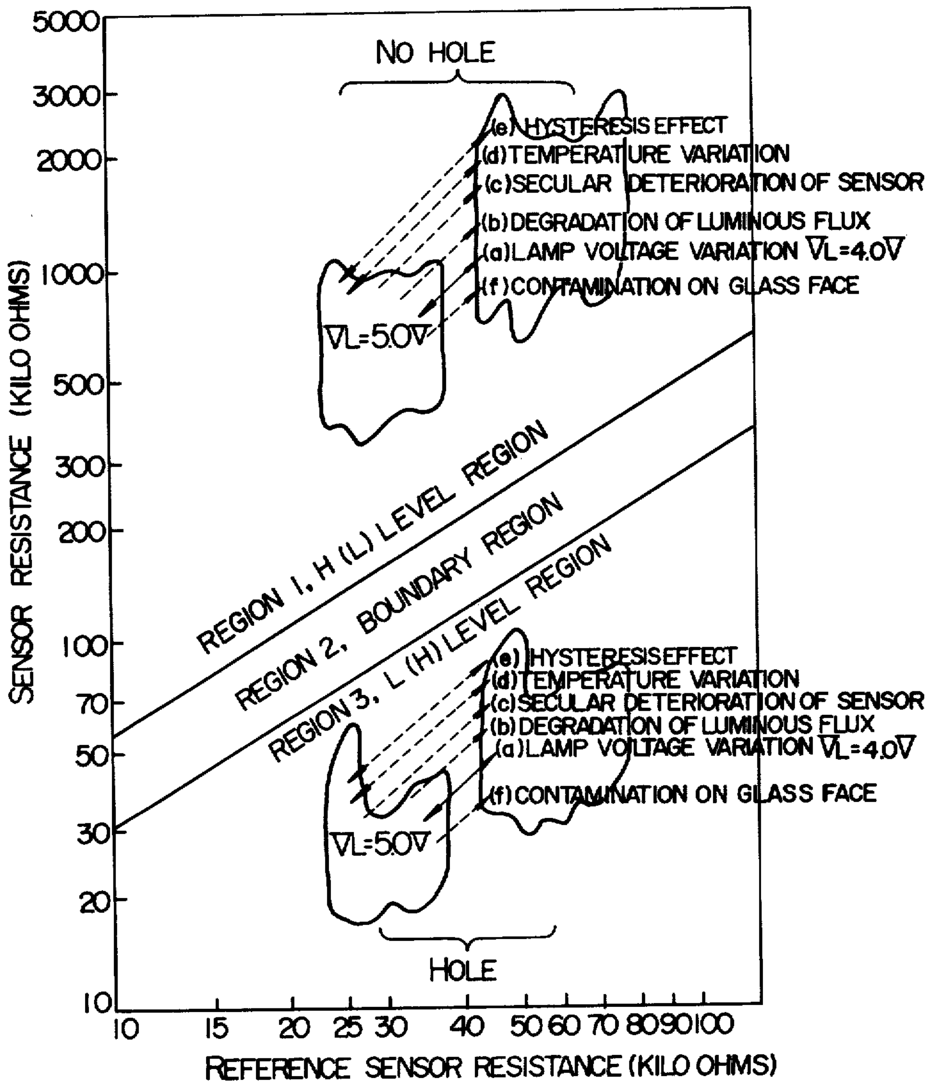
FIG. 3 is a graph illustrating the principle of operation of the sensor matrix according to the invention.

With reference to FIG. 2, an output circuit for deriving a sensor signal will be described. FIGS. 2*b* and 2*c* show examples of the output circuits shown in FIG. 2*a* which employ transistors. The output circuit of FIG. 2*b* is applicable to a column positive matrix as shown in FIG. 1*a* wherein a positivegoing pulse is applied to the column. FIG. 2*c* is an output circuit applicable to a row positive matrix as shown in FIG. 1*b*. When the voltage $(V_s)_H$ at point A is designed to turn on a transistor $T_1$ and the voltage $(V_s)_L$ to turn it off, a reading pulse representative of a hole in the card is delivered from an output terminal in response to a pulse which scans the columns or rows. This will be further detailed. FIG. 3 shows one example of the resistance distribution relation between the reading sensor and the reference sensor of the reader, where the abscissa represents the resistance of the reference light sensors on a logarithmic scale, each of the reference sensors being provided for respective rows, and the ordinate represents the resistance of the reading sensors on a logarithmic scale, each of the reading sensors being provided for respective columns associated with each of the reference sensors. In the figure, a region 2 represents a boundary region of the logic level when circuit elements of the output circuit shown in FIG. 2*c* are assigned suitable circuit constants. If the resistance distribution for the dark state is confined in a region 1 and that for the bright state is confined in a region 3 under the influence of fluctuations in the environmental conditions, the stability of the reading of punched cards can be held. The resistance distribution is changed as shown in FIG. 3 by varying the lighting voltage $V_L$ of the light source from 5.0 volts to 4.0 volts. As seen from the figure, whenever the lighting voltage is decreased, the resistance of the reading sensor and reference sensor for compensation increase at the same rate and the resistance distribution shifts along the region 2 as indicated by the solid line arrows, thereby ensuring the stability of the reading. With the output circuit shown in FIG. 2*c*, it is possible to illuminate the surface of a sensor at an optional and substantially uniform illumination intensity ranging from several luxes to more than several ten thousand luxes. It is also possible to realize with a sensor matrix of the invention an optical card reader which employs room light or sun light without using an additional light source for illuminating the hole of a card.

Since the resistance distribution shifts under the fluctuation of condition other than intensity of illumination as indicated by the dotted line arrows, the compensation for such fluctuation is effective.

The application of a card reader having a structure as explained above will now be described. The following examples are described for better understanding of the invention and do not limit the scope of the invention.

EXAMPLE 1

In addition to the information reading columns or rows, there are provided additional holes in the card in positions corresponding to the compensating sensors arranged in a single additional column or row. Through these holes in the card, the same kind of light as that incident upon sensors used for information reading illuminates additional column sensors or row sensors for compensation.

Figure 4:
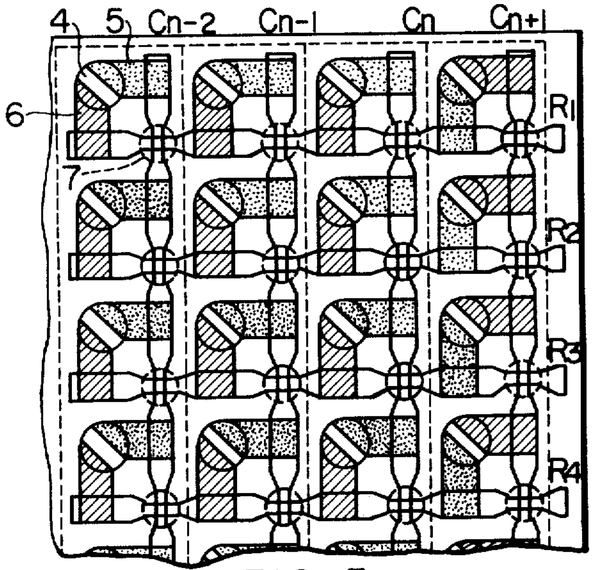
FIG. 4 is a plan view of one embodiment of the sensor matrix according to the invention.

One example of a matrix used for such application of the card reader is shown in FIG. 4. In the figure, numeral 4 designates photoconductive material such as CdS, CdSe or the like, 5 a metallic part which constitutes a blocking contact with the photoconductive material, 6 another metallic part which constitutes an Qhmic contact with a photoconductive material, and 7 an insulator which insulates the column electrode from the row electrode. In only the $C_{n+1}$ column for compensation, the location of the ohmic contact is exchanged with that of the blocking contact. In this embodiment, since the reference sensor as well as the reading sensors are illuminated by the light which has passed through the holes of the card like the reading sensor, the resistance of the reference sensor varies with the unwanted travel of the card as the reading sensor does. Consequently, compensation can be achieved even when the card is located in a position slightly remote from the correct position on the sensor matrix.

EXAMPLE 2

The reference column or row may be remote from the card. The compensation sensor provided for each column or row is illuminated by the light impinging upon other sensors, that is reading sensors, or by other suitable light. Sensors in the $C_{n+1}$ column of FIG. 4 may be detached so as to be used for such separate reference column or row. Further, additional reference sensors having characteristics similar to those of change to the sensors provided for the reading columns may be available.

As has been described, according to the optical card reader of the invention, the reading of the card is achieved, without using a complicated auxiliary circuit, without the influence of various fluctuating conditions such as fluctuations in the lighting voltage of the light source, attenuation in the illumination intensity due to deterioration of the light source lamp, and fluctuations of the light sensors due to aging and temperature therein, thereby improving stability and reliability of the static reading of the card.

Further, in accordance with the card reader of this embodiment of the invention (hereinafter referred to as a reference type), since the presence or absence of a punched hole in the card is discriminated through the resistance ratio of the reference sensor to the reading sensor, the detecting operation, essentially, does not depend on the absolute value of the resistance of the light sensor made of photoconductive material. Accordingly, the reading of the punched hole of the card does not depend considerably on the absolute value of the light intensity of the light which illuminates the surface of the sensor matrix and thus large variations in the lighting voltage of the light source lamp is ensured. However, when the output circuit is constituted by transistors as shown in FIGS. 2*b* and 2*c* which derive a signal from the sensor matrix to convert it into integrated circuit (IC) level (level for integrated circuits of transistor-transistor logic (TTL) or metal-oxide semiconductor (MOS)), the fluctuations in power source voltage is so limited that the output circuit cannot operate without error when the voltage fluctuation considerably exceeds ± 10 % of the standard value. Further, with the output circuit shown in FIGS. 2*b* and 2*c*, it is necessary to pass some large amount of current through the transistors in order to ensure a complete switching operation. Thus, the resistance of the light sensor is required to be smaller than the resistance which permits the aforementioned amount of current to flow. Practically, using a sensor which has a resistance of more than approximately 200 kΩ upon the presence of a punched hole in the card, the output circuit was prevented from operating. For this reason, the illumination intensity on the light sensor surface undergoes a limitation. When an output circuit employing transistors is used, the lamp lighting voltage is prevented from assuming an extremely small value.

A MOS integrated circuit whose input impedance is large and whose input side is actuated by a voltage eliminates such limitation. Among MOS integrated circuits, a complementary MOS integrated circuit whose excellent characteristics have attracted considerable interest is operated with a single power source. Complementary MOS integrated circuits whose working voltage can optionally be selected within the range of about 3 volts to 15 volts are now available. A card reader in which the reference type sensor matrix is developed to meet the advantages of the complementary MOS integrated circuits will be described hereunder.

Reference is now made to FIG. 5 illustrating a block diagram of the card reader using complementary MOS integrated circuits. In the figure, numeral 11 designates an illumination lamp for the punched holes of the card, 12 an assembly located beneath the card and consisting of a reference type sensor matrix, a card supporting mechanism and apertures for guiding the light from a light source, 13 an output circuit for deriving a signal from the sensor matrix, that is an interface circuit on the output side, and 14 an input side interface circuit. Numeral 15 or 15' generally designates a card reader, numeral 15 including constituents 11, 12 and 13, and numeral 15' including constituents 11, 12, 13 and 14 as indicated by the dotted lines. Numeral 16 designates a system or apparatus which makes use of the card reader. As shown in FIG. 5, a power supply line for the lamp can be connected with other power supply lines inside the card reader to be directed to a single outside terminal. FIG. 6 shows the connections between the reference type sensor matrix and input-output circuits. In the figure, numeral 21 designates a reading sensor formed of photoconductive material for reading punched holes in a card, 22 a blocking diode for preventing interactions between sensors of the sensor matrix, and 21' a reference sensor of one column for compensation which constantly receives the light. Numeral 22' designates an additional reference diode for compensation, 23 an output interface circuit of complementary MOS integrated circuits, and 24 an input interface circuit. FIG. 6 shows a card reader which uses a row positive sensor matrix, and wherein a reading pulse is applied to the column $C_1$, $C_2$ . . . , or $C_n$, and a sensor pulse is delivered from the row $R_1$, $R_2$ . . . , or $R_m$ in parallel. It is of course possible to provide a card reader which uses a column positive sensor matrix wherein the diode 22 and reference diode 22' are connected in reverse relation to FIG. 6 and a reading pulse of reverse direction to FIG. 6 is applied to the input columns. With the column positive sensor matrix, the $C_{n+1}$ column or reference terminal shown in FIG. 6 should be grounded.

Referring now to FIG. 7, the sensor matrix is partially illustrated at the first column $C_1$ and the first row $R_1$ for describing the operation of reading a punched hole associated with the first column-first row sensor. Especially, FIG. *7a* shows a connection of complementary MOS integrated circuits in which the input circuit is a complementary MOS integrated circuit, and FIG. *7b* shows the connection of TTL in which the input circuit is a TTL. Since the reference sensors are connected with a common power source $V_{cc}$, when a reading pulse is applied to the input to read the punched hole under the low logic level (L), for example when the first column $C_1$ of FIG. 6 is read, a current flows into the input circuit through a series circuit including the reference sensor at n+1 column and the first column reading sensor. Such circuits of m number, m being equal to the number of rows, are connected in parallel. In accordance with the reader of the invention, the sensor matrix employs sensors. The resistance between each reading column and the reference terminal $C_{n+1}$ is so selected as to suppress a sink current of more than 1.6 mA when all of the sensors on one column are associated with punched holes and the maximum power source voltage of 12.5 V is applied. This permits the use of the input circuit constituted by a complementary MOS integrated circuit having sink current capability for driving TTL. Simple buffer complementary MOS integrated circuits, for example CD-4050 of RCA, USA, and MC-14050 of Motorola, are noted. With the input circuit of open collector TTL, since a small working voltage of about 5 V decreases the sink current and the open collector TTL has the sink current capability of 1.6 mA, there arises no such problem. If the output circuit is also constituted by a simple buffer complementary MOS integrated circuit like the input circuit of a complementary MOS integrated circuit, the output circuit can directly be connected to a complementary MOS integrated circuit and TTL as well.

Now, the voltage transfer characteristics of the complementary MOS output circuit will be explained. Typically, an input voltage level $V_{io}$ at which an output logic level is changed is, although it is variable depending on the characteristics of the employed elements and the working condition of the elements, nearly half the power source voltage. This relation between the input voltage level and the power source voltage is held substantially independent of the power source voltage. Accordingly, for a power source voltage of 12 volts, the input voltage level is about 6 volts; and for a 4 volts power source voltage, the input voltage level is about 2 V. As shown in FIG. 7, the reference sensor and input-output circuits are connected to a common power source which supplies a voltage $V_{cc}$. Upon reading of the card, a pulse is applied to respective columns, the pulse having a high level nearly equal to $V_{cc}$ and low level substantially equal to ground potential. Accordingly, an output voltage $V_s$ at respective rows of the sensor matrix is represented by dividing $V_{cc}$ by the resistance of the sensor on a column to which a reading pulse is applied and the resistance of the reference sensor. The reading sensor and the reference sensor vary in their resistance at the same rate with the fluctuation or variation in environmental conditions such as illumination intensity so that the voltage $V_s$ is maintained substantially constant. In addition, as previously described, the voltage $V_s$ varies proportionally to the variation in the power source voltage as does the inversion voltage $V_{io}$ of the logic level of the complementary MOS output circuit. Based on this fact, in a practical card reader, a circuit as shown in FIG. *7a* is provided with the light source of a 5 volts rating lamp, and the working voltage ranges from 3 volts to 5.5 volts. The lower limit is determined by the lower limit of the working voltage of the complementary MOS IC and the upper limit is determined by the life of a lamp filament. Where a light source consisting of a 12 volts rating lamp is used, the working voltage ranges from 4.5 volts to 12.5 volts. The illumination intensity on the sensor surface is decreased through the punched hole of a card to less than one lux and ambient light or noise which invades the entrance of the card influences the illumination on the sensor surface. This determines the lower limit. As described previously, the upper limit is determined by allowance for the sink current to the input circuit and the upper limit of the working voltage of a complementary MOS IC circuit, and by the life of the lamp used in the device. In the circuit shown in FIG. *7b*, the light source provided by a 5 volts rating lamp is used with a power source of about 5 volts which is equal to the working voltage of a TTL. The working range of the card reader equals the working voltage of the TTL ranging from 4.75 volts to 5.25 volts.

As described above, the card reader including the reference sensor matrix and the complementary MOS IC's can be operated with a single power source of a wide voltage range, and for this reason, it is immune to fluctuation in the power source voltage. Further, the card reader is readily coupled to a system of complementary MOS circuits or to a system of TTL, and it can be driven by the power source of these systems. It is possible to couple such a card reader to a utilization system constituted by MOS IC's other than complementary MOS IC's in the same manner that complementary MOS IC's are connected to usual MOS IC's without taking any special consideration. The card reader provided by a combination of the reference type sensor matrix and the complementary MOS IC's has excellent compensation effects for various fluctuating conditions, and it enjoys high stability and reliability.

The card reader with a complementary MOS output circuit encounters some problems in its manufacturing process. First, matching of the sensor matrix with the output circuit will be explained.

With a power source of 12 volts, the typical value of $V_{io}$ is 6 volts and the complementary MOS output circuits generally have values of $V_{io}$ ranging from 5 to 7 volts, a few of them having an excessive range of 4 to 8 volts. Accordingly, the sensor matrix output is determined such that upon absence of a punched hole the $(V_s)_H$ is larger than and upon presence of the punched hole the $(V_s)_L$ is less than 4 volts. In connection with these problems, the relation between the resistance of the reference sensor and that of the reading sensor will be described. In a graph of FIG. 8, the abscissa represents a resistance ratio $(R_r/R_s)$ of the reference sensor resistance $R_r$ to the reading sensor resistance $R_s$ measured when the reference sensor and the reading sensor are respectively supplied with a voltage of 3 volts, and the ordinate represents a typical output from various sensor matrices, that is an input to the output circuit, measured when a reading pulse is applied under practical working condition as shown in FIG. 6.

The power source voltage is 12 volts. A curved line *a* responds to the dark state where the reading sensor is not associated with the punched hole, a curved line *b* responds to the bright state where the reading sensor is associated with the punched hole. A typical value of $V_{lo}$, that is 6 v, is represented at a dotted line *c*. It will be seen from the figure that in order to locate the dotted line *c* in the middle of the bright state and the dark state, the reference sensor resistance is required to be about four times larger than the reading sensor resistance. When the reference sensor resistance remains two and half to seven times larger than the reading sensor resistance, the matching requirement of the sensor matrix and the output circuit is satisfied. It is of course possible to extend the range of $R_r/R_s$ if the output characteristic of the sensor matrix is matched with input characteristic of the complementary MOS output circuit. In order to obtain a suitably larger resistance of the reference sensor than the reading sensor, the distance between the two electrodes applied on the photoconductive material of the reference sensor and the shape of the electrodes or dimensions thereof may be varied. Thus, the reference type sensor matrix so modified may be used. Alternatively, the light illuminating structure for illuminating the sensors of the sensor matrix may have a light attenuating means for attenuating the intensity of light directed to the reference sensors only. As an example of the light attenuating means, there is an apertured film having selective transmission. The film may be applied between the reference sensors and the light source.

What is claimed is:

1. An optical sensor matrix device comprising:

a plurality of electrically separated column electrodes extending in a first direction, a plurality of electrically separated row electrodes extending in a second direction, a plurality of reference light sensor and blocking diode pairs, each of said reference light sensors being connected in series with a corresponding blocking diode, one end of each of said reference light sensor and blocking diode pairs being connected to the same column electrode, the other ends of said reference light sensor and blocking diode pairs being connected to corresponding row electrodes, a plurality of reading light sensor and blocking diode pairs, each of said reading light sensors being connected in series with a corresponding blocking diode, a reading light sensor and blocking diode pair being connected between each of said row electrodes and each of said column electrodes not connected to a reference light sensor and blocking diode pair, the blocking diodes connected to said reference light sensors being connected to conduct current in a first direction with respect to said column and row electrodes and the blocking diodes connected to said recording light sensors being connected to conduct current in the opposite direction, the resistances of said reference and reading light sensors having similar variations, a plurality of column terminals connected to corresponding column electrodes for sequentially receiving recording electrical signals, and a plurality of row terminals connected to corresponding row electrodes, a readout signal being produced at a row terminal in accordance with the relative values of the resistance of the reading sensor supplied with said reading signal and the resistance of the reference sensor of the corresponding row.

2. An optical sensor matrix according to claim 1 wherein said light sensors are formed of a photoconductive material selected from the group consisting of CdS and CdSe, and wherein said blocking diode includes an electrode which forms a blocking contact with said photoconductive material and another electrode which forms an ohmic contact with said photoconductive material.

3. An optical sensor matrix according to claim 2 in which said column and row electrodes are arranged equidistantly and the light sensor and blocking diode of said pair are formed with substantially the same shape.

4. An optical static card reader for reading a card having holes therein comprising:

a plurality of electrically separated column electrodes extending in a first direction, a plurality of electrically separated row electrodes extending in a second direction, a plurality of reference light sensor and blocking diode pairs, each of said reference light sensors being connected in series with a corresponding blocking diode, one end of each of said reference light sensor and blocking diode pairs being connected to the same column electrode, the other ends of said reference light sensor and blocking diode pairs being connected to corresponding row electrodes, a plurality of reading light sensor and blocking diode pairs, each of said reading light sensors being connected in series with a corresponding blocking diode, a reading light sensor and blocking diode pair being connected between each of said row electrodes and each of said column electrodes not connected to a reference light sensor and blocking diode pair, the blocking diodes connected to said reference light sensors being connected to conduct current in a first direction with respect to said column and row electrodes and the blocking diodes connected to said recording light sensors being connected to conduct current in the opposite direction, the resistances of said reference and reading light sensors having similar variations, a plurality of column terminals connected to corresponding column electrodes for sequentially receiving recording electrical signals, a plurality of row terminals connected to corresponding row electrodes, a readout signal being produce at a row terminal in accordance with the relative values of the resistance of the reading sensor supplied with said reading signal and the resistance of the reference sensor of the corresponding row, means for maintaining the column electrode to which said reference light sensor and blocking diode pair are connected at a predetermined bias potential, and output interface circuit means connected to said row terminals, said interface circuit means being rendered operative by said readout signal, said reading light sensors being arranged to correspond to the possible positions of apertures in said card to be read by said card reader.

5. An optical static card reader according to claim 4 in which said output interface circuits comprise complementary MOS integrated circuits and wherein said reference sensors are illuminated at a suitable illumination intensity by light from a light source illuminating uniformly said reading light sensors.

6. An optical static card reader as defined by claim 4 wherein said light sensors are formed of a photoconductive material selected from the group consisting of CdS and CdSe, and wherein said blocking diode includes an electrode which forms a blocking contact with said photoconductive material and another electrode which forms an ohmic contact with said photoconductive material.

7. An optical static card reader as defined by claim 4 wherein said column and row electrodes are arranged equidistantly and the light sensor and blocking diode of said pair are formed with substantially the same shape.

8. An optical static card reader according to claim 4 in which said reference sensors are arranged in positions remote from the position of said card placed in said card reader.

9. An optical static card reader according to claim 4 in which said reference sensors are arranged in positions corresponding to holes in said card when said card is placed in said card reader.

10. An optical static card reader according to claim 7 in which said reference sensors are arranged in positions corresponding to holes in said card when said card is placed in said card reader.

* * * * *